United States Patent [19]

Price et al.

[11] Patent Number: 4,553,395
[45] Date of Patent: Nov. 19, 1985

[54] MASTER CYLINDER ASSEMBLY FOR A VEHICLE BRAKING SYSTEM

[75] Inventors: Anthony G. Price, Birmingham; David Parry, West Midlands, both of England

[73] Assignee: Lucas Industries public limited company, England

[21] Appl. No.: 499,201

[22] Filed: May 31, 1983

[30] Foreign Application Priority Data

Jun. 11, 1982 [GB] United Kingdom ............... 8216982

[51] Int. Cl.[4] ............................................. B60T 11/20
[52] U.S. Cl. ..................................... 60/562; 60/581; 60/589; 60/591
[58] Field of Search ............... 60/562, 581, 589, 591; 92/130, 135

[56] References Cited

U.S. PATENT DOCUMENTS

| | | | |
|---|---|---|---|
| 2,104,220 | 1/1938 | Bowen | 60/589 |
| 2,615,304 | 10/1952 | Groves | 60/589 |
| 3,117,420 | 11/1964 | Stelzer | 60/562 |
| 3,216,194 | 11/1965 | Yardley | 60/562 |
| 3,568,441 | 3/1971 | Walker | 60/581 |
| 3,889,469 | 6/1975 | Cryder | 60/562 |
| 3,928,970 | 12/1975 | Farr | 60/562 |
| 4,006,593 | 2/1977 | Edwards | 60/581 |

FOREIGN PATENT DOCUMENTS

| | | | |
|---|---|---|---|
| 1650221 | 8/1970 | Fed. Rep. of Germany | 92/130 |
| 2084678A | 4/1982 | United Kingdom | 60/581 |

*Primary Examiner*—Sheldon J. Richter
*Assistant Examiner*—Randolph A. Smith
*Attorney, Agent, or Firm*—Laff, Whitesel, Conte & Saret

[57] ABSTRACT

The piston of an hydraulic master cylinder is guided to slide in portions of a bore in a body on opposite sides of a port in the wall of the body by a guide portion of the piston which is disposed on the outermost side of the port and by a cylindrical, axially extending, guide part at the outer end of a radial flange on a retainer. The retainer is mounted on an extension at the inner end of the piston and forms an abutment for a return spring for the piston.

5 Claims, 1 Drawing Figure

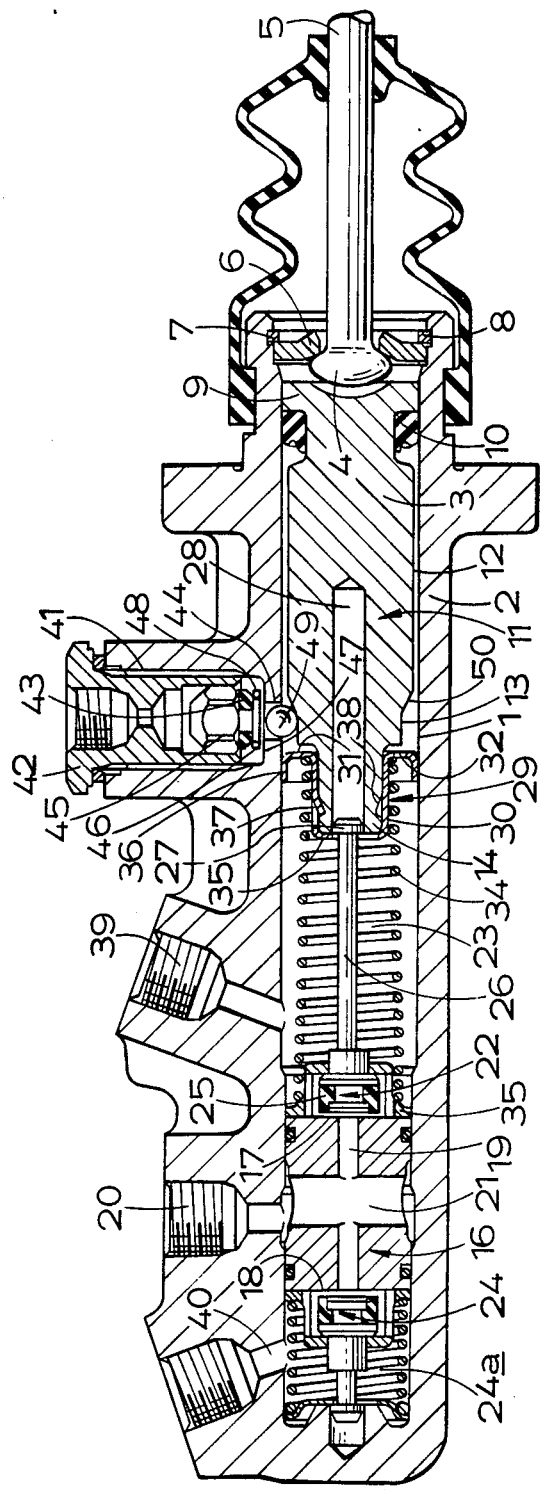

MASTER CYLINDER ASSEMBLY FOR A VEHICLE BRAKING SYSTEM

This invention relates to master cylinder assemblies for vehicle hydraulic systems of the kind in which a pressure space in advance of a piston working in a bore in a housing communicates with a reservoir for fluid through a recuperation valve which is normally open when the piston is in a retracted position but which is closed in response to initial movement of the piston in an operating direction, subsequent movement of the piston in the same direction pressurising fluid in the pressure space to operate ancilliary equipment, and a compression return spring acts on the piston through a retainer carried by an extension at the inner end of the piston to urge the piston into the retracted position.

In some known master cylinder assemblies of the kind set forth the piston is guided in the bore by axially spaced lands on the piston which engage slidably with portion of the bore on opposite sides of a port in the wall of the cylinder. For example the port may comprise a transfer port connected to a similar transfer port in a second similar master cylinder through a common transfer passage with communication between the pressure spaces of the two master cylinders being cut-off by transfer valve means when one of the master cylinders is operated on its own.

To facilitate installation in limited spaces it is desirable to restrict the overall length of master cylinder assemblies of the kind set forth to minimum values.

According to our invention in a master cylinder assembly of the kind set forth the piston is guided to slide in portions of the bore on opposite sides of a port in the wall of the housing by means of a guide portion of the piston which is disposed on the outermost side of the port and by a cylindrical, axially extending, guide part at the outer end of a radial flange on the retainer, the retainer being mounted on the extension at the inner end of the piston and forming the abutment for the return spring for the piston.

Since the piston is guided in the bore only on the outermost side of the transfer port by means of the guide portion, the piston itself is simplified in construction and can be relatively short axially since guidance is otherwise achieved by the retainer. This, in turn, will mean that the overall length of the master cylinder is of a complementary length. Thus the assembly is relatively more compact and therefore lighter in weight and cheaper to produce.

Preferably the axial length of the guide part is similar to the axial length of the guide portion.

The retainer may be of top-hat outline adapted to enclose the free end of the extension with the guide part extending from the flange in a direction relatively away from the piston.

The retainer may comprise a one-piece component, suitably a metal pressing, with apertures provided in the flange, so that movement of the piston is not impeded by fluid in the pressure space, and a finger is displaced from the retainer to couple the retainer to the extension.

Stability is achieved by the closeness of fit between the retainer and the piston over a relatively long bearing surface. Also concentricity tolerance is unlikely to be a significant problem since the distance by which the guide portion and the guide part are spaced apart is relatively great compared with their contact lengths within the bore.

In a construction in which the port in the wall of the housing comprises a transfer port connected to a transfer port in a similar master cylinder through a transfer passage, the retainer also acts to hold the recuperation valve in an open position when the piston is in the retracted position.

One embodiment of our invention is illustrated in the single FIGURE of the accompanying drawings which is a longitudinal section through an hydraulic master cylinder comprising one of a pair of similar master cylinders which comprise a dual master cylinder assembly.

A dual hydraulic master cylinder assembly comprises two tandem master cylinders, each as illustrated. Each master cylinder comprises a bore 1 provided in a body 2. The two bodies are identical in construction and can be installed in any convenient spaced locations in a vehicle.

As the two master cylinders are identical in construction, only one need be described.

A piston 3 working in the bore 1 is engaged at its rear end by a part-spherical head 4 on a pedal-operated pushrod 5. A stop for the head 4 is formed by an annular collar 6 located by a spring ring or circlip 7 received in an annular groove 8 in the bore 1.

The piston 3 comprises a guide portion 9 working in the bore 2, a seal 10, and a forward extension 11 of reduced diameter. The extension 11 comprises three stepped portions 12, 13 and 14 of different areas, of which the portion 12 of greatest area is contiguous with the guide portion 9, and the portion 14 of smallest area comprises the innermost portion of the extension 11.

A secondary piston 16 works in a portion of the bore 1 in advance of the piston 3. Valve seatings 17 and 18 at opposite ends of the piston 16 surround a longitudinal passage 19 which is at all times in communication with a port 20 leading to a reservoir through a diametral passage 21 in the piston 16. A primary recuperation valve 22 controls communication between the port 20 and a primary pressure space 23 between the two pistons, and a secondary recuperation valve 24 controls communication between the port 20 and a secondary pressure space 24a between the secondary piston 16 and the closed end of the bore 1.

The recuperation valve 22 comprises a head 25 for engagement with the seating 17. The head 25 is carried by the forward end of an axially extending stem or rod 26 of which the opposite end carries an enlarged head 27 guided to slide in a longitudinally extending bore 28 in the adjacent end of the extension 11. The head 25 is retained within the bore 28 by a retainer 29 in the form of a one-piece pressing which fits over the portion 14 of the extension 11, having a cylindrical sleeve-like body 30 which encloses the portion 14. A radial flange 31 on the retainer 29 is provided with apertures 32 and forms an abutment for one end of a compression return spring 34 of which the opposite end acts on a cage 35 in which the head 25 is housed. In the position shown in the drawings the spring 34 urges the piston 3 into a retracted position with the head 25 spaced from the seating 17 by the engagement of the edge of a flange 35 surrounding an aperture in the inner end of the retainer 29 with the head 27. The outer edge of the flange 31 is contiguous with a forwardly extending axially extending guide part 36 which is slidable in a portion of the bore 1 spaced from the portion in which the guide portion 9 slides. The retainer 29 is coupled to the piston 3 by means of a finger 37 pierced from the body 30 and engaging in a recess 38 in the extension 11.

The secondary recuperation valve 24 is similar to the valve 22.

The pressure space 23 is adapted to be connected to a vehicle brake through an outlet port 39, and the secondary pressure space 24a through an outlet port 40. Normally the pressure spaces 23 and 24a of one master cylinder will be connected to brakes on one side of a vehicle, for example an agricultural tractor, or to respective brakes on a tractor and a trailer, and the pressure space of the other master cylinder will be connected to brakes on the opposite side of the vehicle. Thus both master cylinders will be operated simultaneously to retard the vehicle, and independently for steering.

The two pressure spaces 23 of the master cylinders are interconnected by a transfer passage comprising a pipe-line which is connected at each opposite end to a radial outlet passage 41 in the wall of the body 2 through a suitable union 42, a transfer valve 43, and a transfer port 44.

Each passage 41 extends upwardly from its respective bore 1 when the master cylinders are installed in a vehicle in their positions of use.

The transfer valve 43 comprises a valve member constituted by a piston 45, and a seal 46 of elastomeric material, suitably rubber, mounted on one end of the piston 45, the seal 46 being engageable with a seating 47 comprising a shoulder at a step in diameter in the passage 41 and surrounding the port 44.

The seal 46 is provided with a plurality of integral, discrete, deformable, and collapsible resilient axially extending projections 48 on the circumference of its face adjacent to the seating 47, and, in a normal intermediate position, the valve member is urged towards the seating 47 so that the projections 48 engage with the seating, the remainder of the face of the seal 46 being held out of direct engagement with the seating 47 by the projections 48.

A thrust member 49 in the form of a ball is guided in the transfer port 44. The thrust member 49 is spaced from the seal 46 of the valve member and, in the retracted position shown, engages with the intermediate stepped portion 13 of the extension 11.

When one of the master cylinders is operated a short forward movement of the piston 3 with corresponding compression of the spring 27 is sufficient to cause the head 25 to engage with the seating 17 to isolate the reservoir from the pressure space 23 and advance the piston 16 in the bore 1 to close the secondary recuperation valve 24. Simultaneously, or almost immediately thereafter, the piston 3 also urges the thrust member 49 radially outwardly by the engagement therewith of an inclined annular face 50 comprising a shoulder between the portions 12 and 13. This movement urges the valve member 45 away from the adjacent seating 47 and into a fully open position. Further movement of the pistons 3 and 16 in the same direction causes fluid to flow through the outlet ports 39 and 40 to the brakes and to the transfer passage through the open transfer valve 43 which, in turn, creates a pressure drop across the valve member of the other master cylinder, urging that valve member towards the adjacent seating in the body of that master cylinder. The resilient projections 48 on the seal 46 collapse so that the face of the seal can engage fully with the seating thereby closing the transfer valve 43 of the said other master cylinder to isolate the pressure spaces 23 of the two master cylinders from each other.

When the master cylinders are operated simultaneously the thrust members 49 both act in opposite directions to hold their respective valve members away from the seatings 47, so that the pressure spaces 23 are in free communication to compensate for differential wear of the linings of the brakes which the master cylinders operate.

The piston 3 is guided in portions of the bore 1 on opposite sides of the transfer port 44 by the guide portion 9 and the guide part 36 which are spaced apart by a substantial distance and which are both of relatively short axial length.

We claim:

1. A master cylinder assembly for a vehicle hydraulic system comprising a housing having a cylindrical bore defined by a wall provided with a port and comprising an outer bore portion on the outer side of said port and an inner bore portion on said inner side of said port, a piston in said bore and having an outer end guide portion working in said outer bore portion, and intermediate portion projecting from said outer end portion and having an inner end, said piston being movable between a retracted position and an operating position, means defining a pressure space in said bore in advance of said outer end of said piston, a reservoir for fluid, a recuperation valve controlling communication between said reservoir and said pressure space, said recuperation valve being open when said piston is in said retracted position but being adapted to close to isolate said pressure space from said reservoir in response to an initial movement of said piston away from said retracted position and towards said operating position, further movement of said piston in the same direction towards said operating position pressurising fluid in said pressure space to operate auxiliary equipment, an extension at said inner end of said intermediate portion, integral and rigid with said piston, and having a free end, a retainer carried by said extension, and a compression return spring acting on said piston through said retainer to urge said piston into said retracted position, wherein said retainer is mounted on said extension and forms an abutment for said return spring, said retainer including a radial flange having an inner end and an outer end, and a cylindrical, axially extending, guide part at said outer end of said flange slidably guided in said inner bore portion on the said inner side of said port, said piston being guided for sliding movement in said inner and outer bore portions of said bore by only said outer guide portion of said piston and said guide part, which are disposed on opposite sides of said portion irrespective of the axial position of said piston in said bore, said assembly further comprising a coupling means at said inner end of said flange at least partially encircling said extension and co-operating therewith to retain said retainer on said extension, substantially against relative axial movement with respect to said piston.

2. A master cylinder as claimed in claim 1, wherein said guide part and said outer guide portion have substantially the same axial lengths.

3. A master cylinder assembly as claimed in claim 1, wherein said retainer is of top-hat outline and is adapted to enclose said free end of said extension, and said guide part extends from said flange in a direction relatively away from said piston.

4. A master cylinder assembly as claimed in claim 1, wherein said retainer comprises a one-piece component, said flange is provided with at least one aperture, and a finger is displaced from said retainer to couple said retainer to said extension.

5. A master cylinder assembly as claimed in claim 1, wherein said port in said wall of the housing comprises a transfer port, and said retainer also acts to hold said recuperation valve in an open position when said piston is in said retracted position.

* * * * *